J. C. MOORE.
Corn-Planter.
No. 35,831.
Patented July 8, 1862.
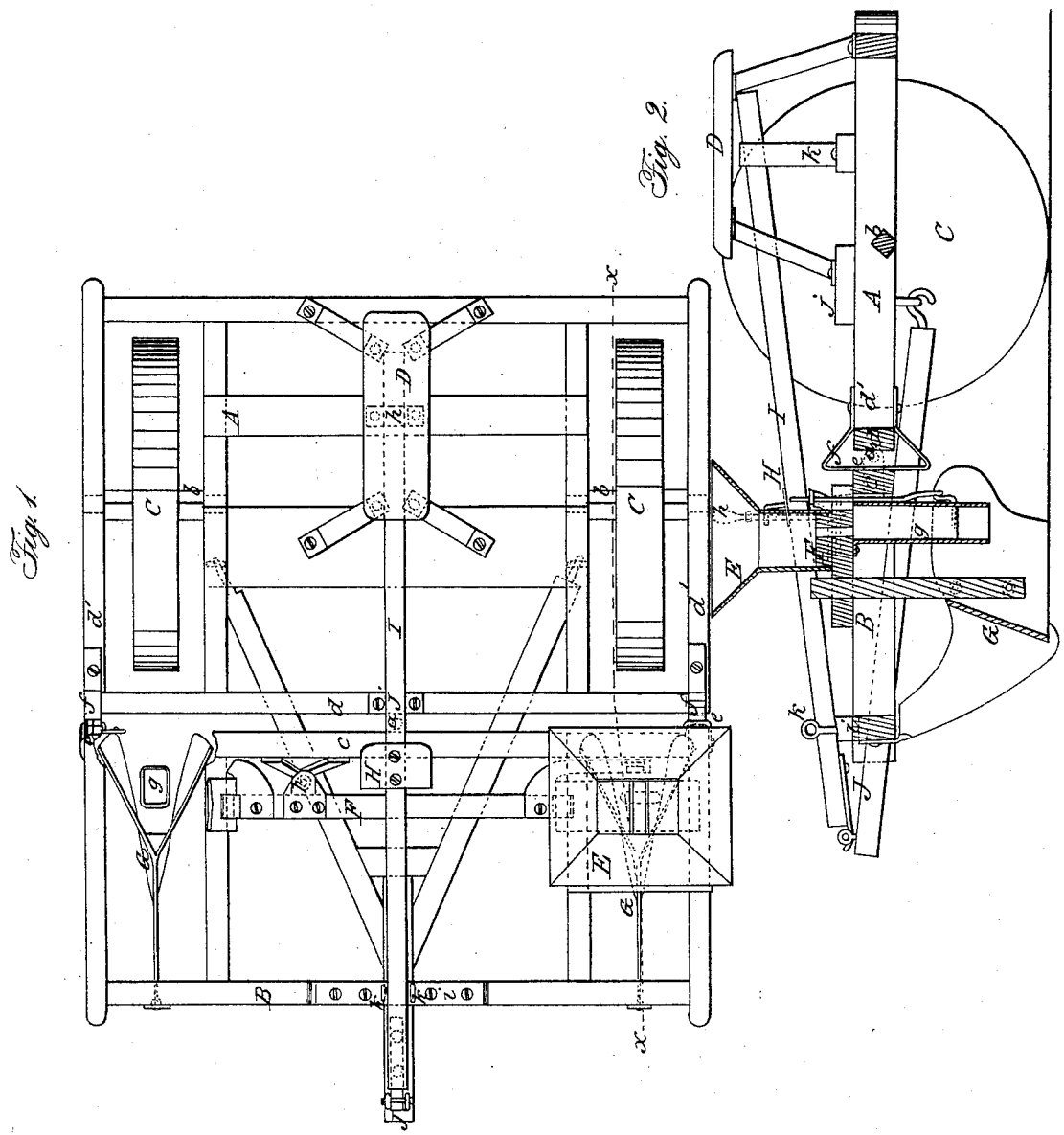
Witnesses:
J. W. Coombs
G. W. Reed
Inventor:
J. C. Moore
per Munn & Co
Attorneys

UNITED STATES PATENT OFFICE.

J. C. MOORE, OF PEORIA, ILLINOIS.

IMPROVEMENT IN CORN-PLANTERS.

Specification forming part of Letters Patent No. 35,831, dated July 8, 1862.

*To all whom it may concern:*

Be it known that J. C. MOORE, of Peoria, in the county of Peoria and State of Illinois, have invented a new and Improved Corn-Planter; and I do hereby declare that the following is a full, clear, and exact description of the same, reference being had to the accompanying drawings, forming a part of this specification, in which—

Figure 1 represents a longitudinal vertical section of my invention, taken in the plane indicated by the line $x\,x$, Fig. 2. Fig. 2 is a plan or top view of the same.

Similar letters of reference in both views indicate corresponding parts.

This invention consists in the arrangement of two frames, one supported by the wheels and the other, which carries the seed-distributing mechanism, supported by the runners or plows, said frames being connected by a swivel-hinge in the center and guiding-buffers on both sides in such a manner that each frame can accommodate itself to the inequalities of the ground independent of the other, and that by weighing down on the near end of the after frame the central portions of both frames are raised and the plows are thrown out of the ground.

It consists, further, in the arrangement of a lever having its bearings one on the front part of the forward frame, and one before and one behind the axle of the wheels supporting the after frame, in combination with the two hinged frames, in such a manner that by the weight of the person operating the seed-slide the two frames are kept in line or nearly level, and the plows are prevented from rising out of the ground.

To enable those skilled in the art to make and use my invention, I will proceed to describe its construction and operation, with reference to the drawings.

The frame of my corn-planter consists of two parts, A B, which are connected together by the swivel-joint $a$. The after-frame, A, is supported by two wheels, C, each of which runs on a separate axle, $b$.

D is the driver's seat, which is supported by the after frame, A, in such a position that the driver can throw his weight behind or in front of the axles.

The swivel-joint $a$, which connects the after frame with the forward frame, is situated in the center of cross-timbers $c\,d$, and it may consist of an eyebolt and staple, as shown in the drawings, or of any other convenient contrivance, whereby both frames are left free to accommodate themselves independently of each other to the inequalities of the ground. The ends of the cross-timbers $c\,d$ are also connected by means of loops $e$, projecting from the ends of timber $c$, and catching over the spring-guides or buffers $f$, that are rigidly attached to the ends of cross-timber $d$, or to the side timbers, $d'$, of the after frame, A. The buffers $f$ are so formed that they permit the ends of cross-timber $c$, and with it the seed-distributing devices and plows, to move up and down independently of the after frame, and at the same time they break the force of the collisions which may occur between the two frames.

The forward frame, B, supports the hoppers E, from which the seed is discharged by the action of a slide, F, in the ordinary manner, and the seed passes through tubes $g$ down into furrows opened by the plows G. These plows are double-mold-board cutter-plows, which open the furrows in the ground directly in front of the wheels C, which are intended to cover the seed after it has been deposited in the ground. The cutter cuts the way for the mold-boards, which, being placed at the bottom, as shown in the drawings, cause the dirt to fall behind to cover the corn, and the upper winged parts of the mold-boards throw the clods out of the way, leaving nothing but pulverized ground to cover the corn or seed.

The seed-slide F is operated by means of a vibrating lever, $h$, to which motion is imparted at the proper intervals by a person sitting on the seat H. This seat is secured to a lever, I, which rests on the frames A B, having its bearings in front on the front cross-bar, $i$, of frame B, and in the rear on two points, $j\,k$, of the frame A—one before and the other behind the axles of the wheels C—and its front end is confined between two studs or eyebolts, $k$. By the action of this lever and by the weight of the person dropping the seed the two frames are kept in line and the plows are prevented rising out of the ground; but if the person dropping the seed relieves the lever, and at the same time the driver throws his weight on the back end of the seat, the middle parts of the frames rise up and the plows are thrown out of the ground. This action takes place entirely independent of the draft-pole J, which is hinged to the after frame, A, close to the axles $b$, and which therefore does not change its position, or only very little when the plows are thrown out of the ground.

Having thus fully described my invention, what I claim as new, and desire to secure by Letters Patent, is—

1. The arrangement of the swivel-joint $a$ and guiding-buffers $e f$, in combination with the frame A, supporting the driver's seat D, and with the frame B, carrying the seed-dropping mechanism, constructed and operating as and for the purpose shown and described.

2. The arrangement of the lever I, in combination with the hinged frames A B, constructed and operating as and for the purpose set forth.

J. C. MOORE.

Witnesses:
JOHN McCLALLEN,
R. KIMBLE.